US011475577B2

United States Patent
Slocum et al.

(10) Patent No.: US 11,475,577 B2
(45) Date of Patent: Oct. 18, 2022

(54) MARKERLESS MOTION CAPTURE OF ANIMATE SUBJECT WITH PREDICTION OF FUTURE MOTION

(71) Applicant: Southwest Research Institute, San Antonio, TX (US)

(72) Inventors: Samuel E. Slocum, San Antonio, TX (US); Omar D. Medjaouri, San Antonio, TX (US); Edmond M. DuPont, San Antonio, TX (US); Christopher I. Mentzer, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 58 days.

(21) Appl. No.: 17/086,440

(22) Filed: Nov. 1, 2020

(65) Prior Publication Data

US 2022/0138967 A1 May 5, 2022

(51) Int. Cl.
*G06T 13/80* (2011.01)
*G06T 7/246* (2017.01)
*G06T 7/215* (2017.01)

(52) U.S. Cl.
CPC ............. *G06T 7/251* (2017.01); *G06T 7/215* (2017.01); *G06T 13/80* (2013.01); *G06T 2207/10016* (2013.01); *G06T 2207/20081* (2013.01); *G06T 2207/20084* (2013.01)

(58) Field of Classification Search
CPC ......... G06T 7/251; G06T 7/215; G06T 13/80; G06T 2207/10016; G06T 2207/20081; G06T 2207/20084; G06T 13/40
See application file for complete search history.

(56) References Cited

U.S. PATENT DOCUMENTS

| 10,445,930 | B1* | 10/2019 | Saylor | A61B 5/7267 |
|---|---|---|---|---|
| 2016/0370854 | A1* | 12/2016 | Steele | G06F 3/017 |
| 2019/0354105 | A1* | 11/2019 | Cunningham | G05D 1/0246 |
| 2020/0082248 | A1* | 3/2020 | Villegas | G05D 1/0223 |
| 2020/0134300 | A1* | 4/2020 | Kim | G06V 40/20 |

OTHER PUBLICATIONS

Written Opinion of the International Searching Authority PCT/US2021/056367, dated Jan. 26, 2022.

\* cited by examiner

*Primary Examiner* — Syed Haider
(74) *Attorney, Agent, or Firm* — Livingston Law Firm (57) ABSTRACT

A motion prediction system for predicting the motion of a random animate subject. A first neural network is a markerless motion capture network, trained to receive video data of the subject and to process the video data to generate a time sequence of musculoskeletal motion capture data. A second neural network is a motion prediction network, trained to receive the musculoskeletal motion capture data and to process the data to generate a prediction of the subject's location based on position change in position of joints and/or muscles.

20 Claims, 9 Drawing Sheets

MARKERLESS MOTION CAPTURE OF ANIMATE SUBJECT WITH PREDICTION OF FUTURE MOTION

TECHNICAL FIELD OF THE INVENTION

This invention relates to motion capture systems, and more particularly to using neural networks to transform video data of a random unmarked subject into predictive motion data.

BACKGROUND OF THE INVENTION

Existing motion prediction techniques often make use of classical perception solutions such as optical flow. These techniques can provide simple predictions of direction and speed, but the ability to make accurate predictions is strongly dependent on the amount of lateral motion prior to prediction. This can pose problems for automated vehicles as it is possible for pedestrians to move into danger zones before the prediction can be correctly made. The reaction time of the control system increases the total time before the vehicle can perform a safety maneuver.

Recent motion prediction studies have focused on classifying the types of activities being performed in video clips and providing semantic descriptions of these activities. Work in this field has begun to look at the ability of recurrent neural networks to make predictions of future activity. This work, however, has largely focused on fine grained motion predictions, providing a prediction for each joint position of a person. These studies intentionally remove any translational motion of the base reference frame so that the predictions provide only a relative position to the pelvis, for instance.

Much recent work for pedestrian motion prediction has focused on applications of classical filtering and modeling or applying modern neural networks to long term pedestrian behavioral patterns to use historical large-scale motion patterns to determine future motion in an intersection. These techniques are successful at predicting that a person approaching an intersection at a certain angle and speed is likely to cross the intersection rather than turn but give little insight into the likelihood of sudden behavior changes.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a motion prediction system that tracks skeletal joint locations of a moving subject and predicts the subject's immediate future movement. As indicated in the Background, neural networks and machine learning for motion prediction has focused on fine-grained prediction. However, this level of prediction is not necessary for many applications; more global motion predictions such as whole-body motion vectors are sufficient.

In the examples of this description, the subject is a human pedestrian, whose motion is predicted for the purpose of avoiding accidents with vehicles. No external markers are required to be placed on the subject. The system is easily extended to capture multiple subjects. Furthermore, the tracking of skeletal joint locations and motion prediction therefrom can be extended to any animate subject having a skeleton, i.e., animals. Motion prediction of humans and animals can have application in many different fields.

Figure 1A:
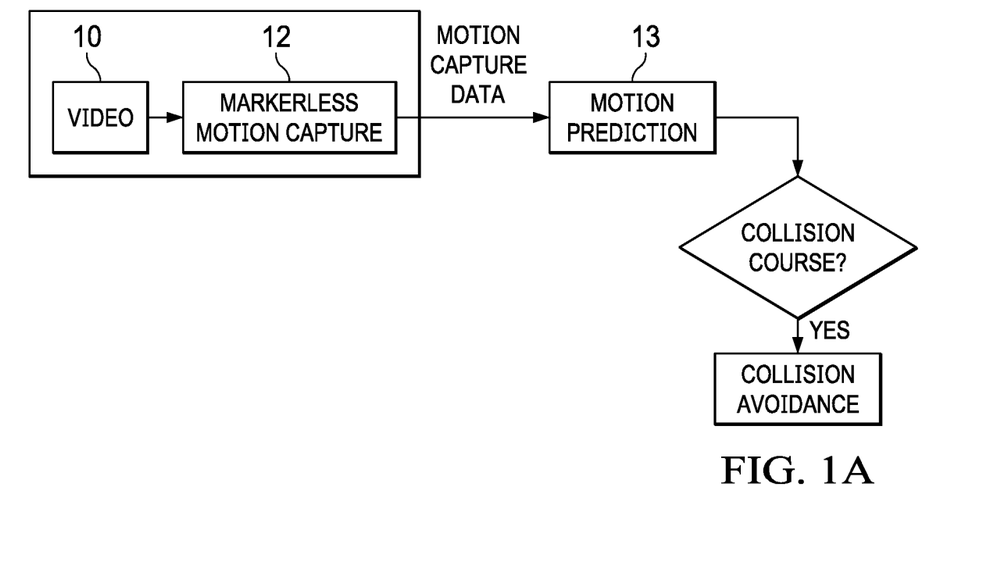
FIG. 1A illustrates the motion prediction system applied for pedestrian motion prediction.

FIG. 1A is a high-level depiction of a motion prediction system 100 in accordance with the invention. As explained below, system 100 captures video of a subject and uses markerless motion capture data to predict sudden changes in movement of the subject.

A video camera 10 captures a sequence of images (video) of a subject, which in the example of this description, is a pedestrian. For purposes of many applications, a single camera may be used. In other application, more than one camera may be used to provide three-dimensional information.

The time period of the video capture may vary depending on the application. For some applications, the time period may be as long as the time period within which the subject is in the field of view of camera 10. However, for other applications, such as pedestrian collision avoidance where sudden moves are of interest, the time period may be much shorter, such as several seconds or less. The number of frames and the frequency of input frames may be optimized depending on the application.

Motion capture neural network 12 is trained to use the video data as input, and from this video data to extract the location of a selected set of the subject's joints (or other selected body segments). For purposes of this invention, the head pose is considered a joint location. The result is a dataset of joint locations over a period of time.

A motion capture neural network 12 for extracting motion capture data from video is described below. The motion capture is "markerless" in the sense that the motion data is generated without the use of markers on the subject. As explained below, neural network 12 is trained using machine learning techniques to providing motion data representing an animate object from input video of the subject in motion. Neural network 12 may be a deep convolutional neural network (CNN). However, it is to be understood that the use of other types of learning machines are possible and equivalent, all being implemented with appropriate computing hardware and software.

For purposes of this description, the output of neural network 12 is referred to as "musculoskeletal motion capture data". It includes data representing any segment of the subject's muscle or skeletal system. The data does not represent external features of the subject's body, but rather internal features.

The musculoskeletal motion capture data is delivered to a second neural network 13 that uses the motion capture data to predict the movement of the subject. As an example, where the motion capture data is joint locations, the joint locations are used to predict immediate future changes in the location of a core segment of the subject, such as the center of the subject's pelvis.

Markerless Motion Capture Training

U.S. Pat. No. 10,445,930, entitled "Markerless Motion Capture Using Machine Learning and Training with Biomechanical Data" to Kase Saylor, et al, and assigned to Southwest Research Institute, describes how neural network 12 may be trained to extract joint locations from video data. That patent is incorporated herein by reference.

Figure 1B:
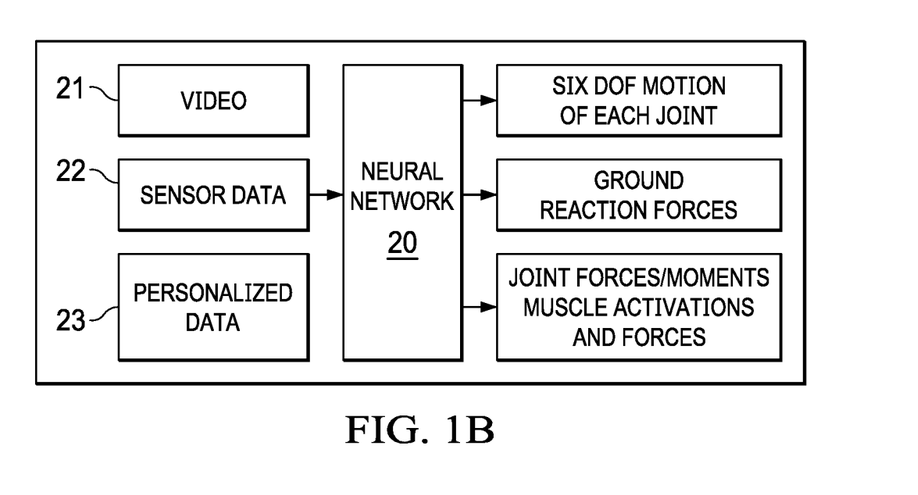
FIG. 1B illustrates an example of training a markerless motion capture neural network.

FIG. 1B illustrates a training system 200 for training neural network 12 to perform markerless motion capture. Neural network 12 is trained using a biomechanically correct "ground truth" training dataset. A marker-based motion capture system is used to capture video data. Using data from the marker-based motion capture system, a complete, subject-specific, model-driven biomechanical motion analysis is performed for each motion capture session of each subject. Alternatively, an inertial measurement unit (IMU) based motion capture system can be used in place of the marker-based motion capture system to generate the data for the subject-specific biomechanical model.

The output of this analysis is a complete 3D kinematic description of each model-defined body segment, and this data serves as the training data set for network 12. Then, the output of the trained neural network 12 is equivalent to the output from the model-driven biomechanical motion analysis.

The marker-based motion capture system uses infra-red (IR) markers and IR cameras, but other marker-based or body-worn sensor systems may be used. To train with video data comparable to biomechanics data produced by the marker-based capture system, a video capture framerate greater or equal to 100 frames per second (FPS) marker-based is used. USB3-based cameras may be used to achieve the desired frame rates, and are able to achieve a frame rate of 396 FPS or higher.

USB3 cameras result in a significant amount of data captured, and with the abundance of data and the structure of the neural network, overfitting of the network to a fixed subject orientation is addressed by replicating each motion capture session using three separate subject orientations. This creates enough differentiation in each take to create a more resilient neural network for different subject alignments.

Training data is acquired for multiple individuals, with a validated biomechanical model for each individual. The use of these validated biomechanical models allows the CNN/RNN 20 to surpass "animation grade" motion capture and provide results that go beyond simply locating the 3D spatial location of hip and knee joints, to measuring the 3D position of each joint as well as the three independent rotations of the interposed body segments (e.g. flexion, abduction and rotation of the femur).

Neural network 20 is trained to estimate the subject's kinematic state from the 3D joint locations, demonstrating the ability to map a reduced set of body points (a simplified input) to the full biomechanical state in the context of natural movements. Furthermore, a framework for modeling the human body kinematic chain in order to model body segment orientations was developed. This new framework provides additional outputs from a revised joint location CNN, one which predicts the full orientation of body segments with respect to the camera. This new output enables the retrieval of a full biomechanical state without the need for establishing additional body points (i.e., beyond the joint locations). By introducing the concept of body orientation to the neural network, the resulting network output provides the same number of degrees of freedom as conventional biomechanical models that require dozens of physical markers to be placed at precise points on the test subject.

The overall procedure for training neural network 20 is improved by fusing data from a motion capture system and a machine vision camera system. First, the motion capture system and the camera system are calibrated together. This entails calibrating cameras to correct for lens distortion and using multi-view geometry to determine the transformations between the machine vision cameras and the motion capture system origin. Second, an action sequence, known as a "take," is captured, simultaneously with both the machine vision system and the motion capture system. A trigger signal is used to ensure time synchronization. Next, the motion capture data is used to fit a kinematic model using software that produces joint locations in the motion capture coordinate system as well as the joint angles, or kinematic state, of the subject at every time-step. An example of suitable software is OpenSim. Finally, the kinematic state data is aggregated into a common file with the (markerless) machine vision data to produce a single file that stores all relevant data for the take. Such files, representing a number of different subjects and actions, form a database used to train CNN/RNN 20. Using the camera properties and the known transformations to the motion capture coordinate frame, the 3D joint locations and other information can be projected into the camera's frame of reference and used to train CNN/RNN 20 for markerless motion capture. This approach automates as much of the training steps as possible, and, thereby, enables a more rapid approach for adding training data to the overall training set in the future.

Figure 2:
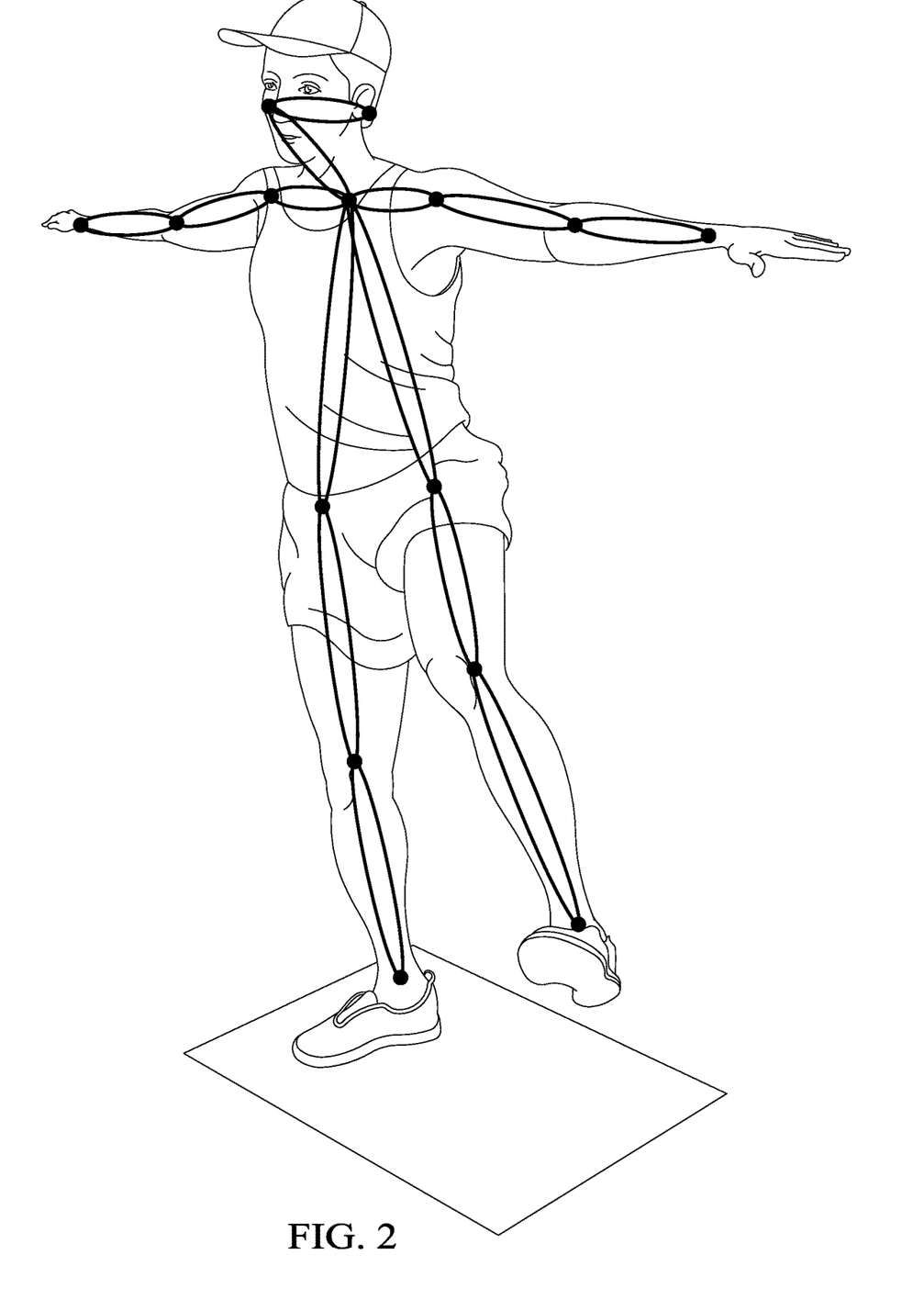
FIG. 2 illustrates joint locations extracted by the motion capture neural network.
Figure 3:
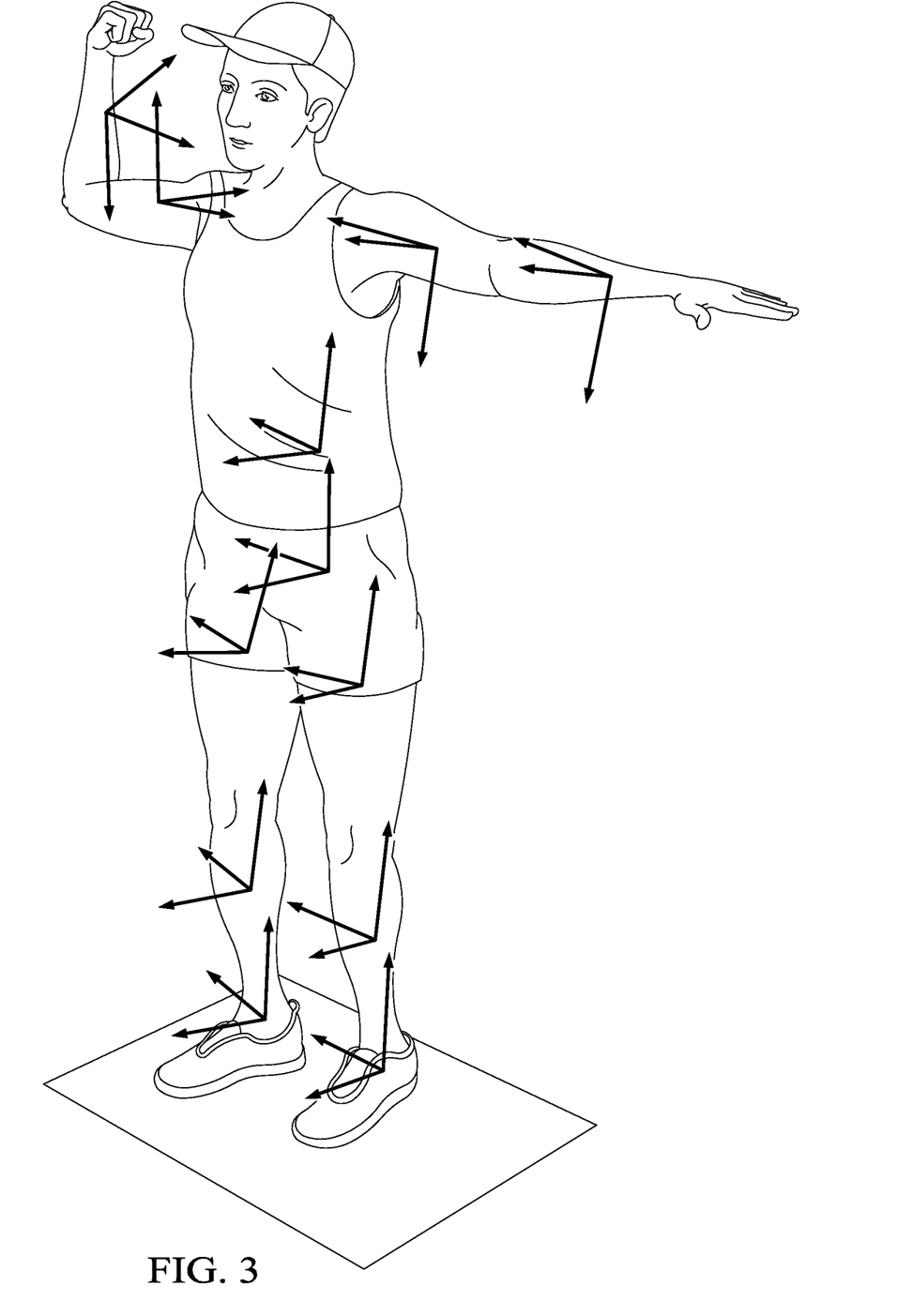
FIG. 3 illustrates the body segment orientations extracted by the motion capture neural network.
Figure 4A:
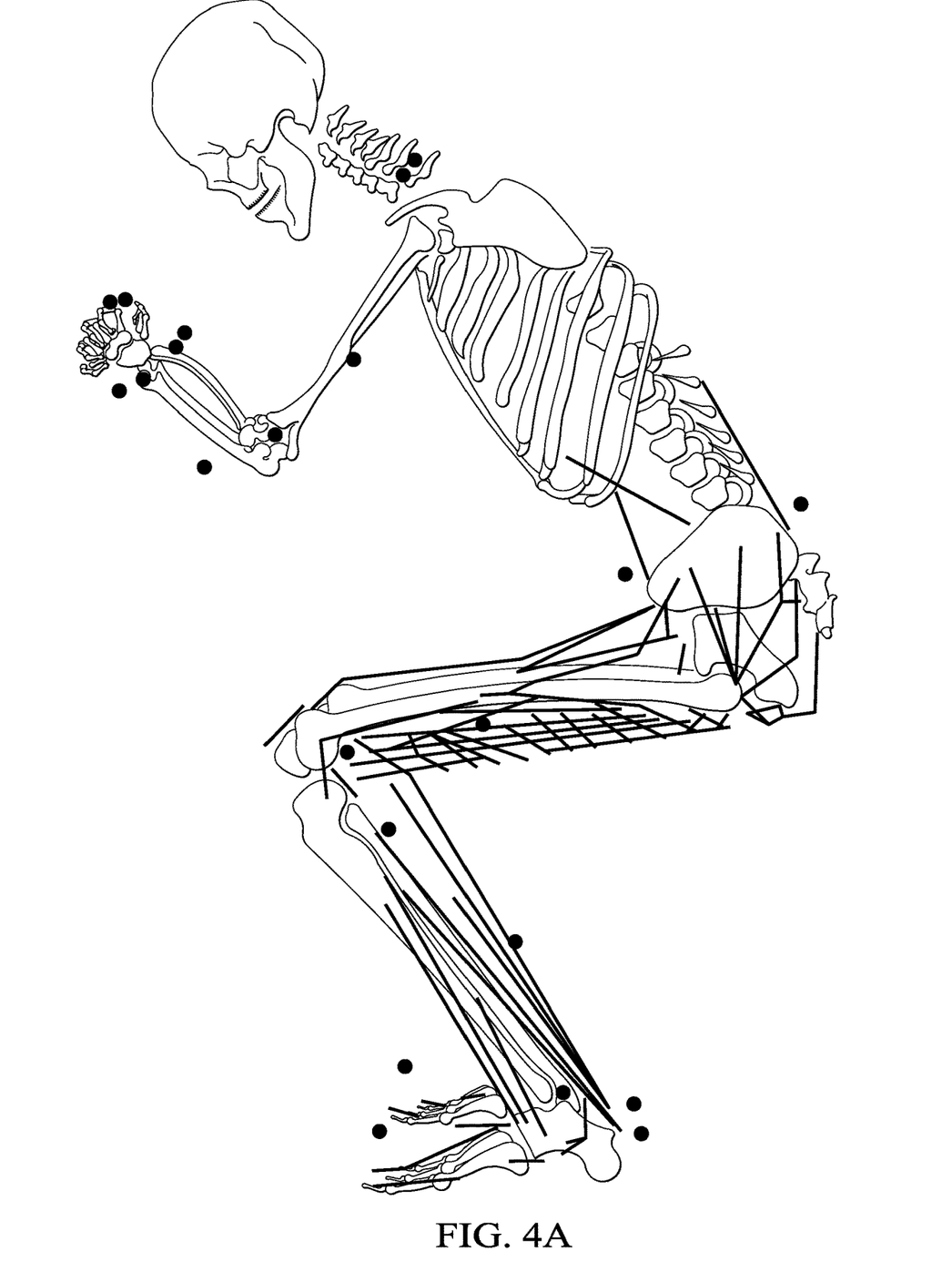
FIGS. 4A and 4B illustrate a biomechanical representation of the subject extracted by the motion capture neural network.
Figure 4B:
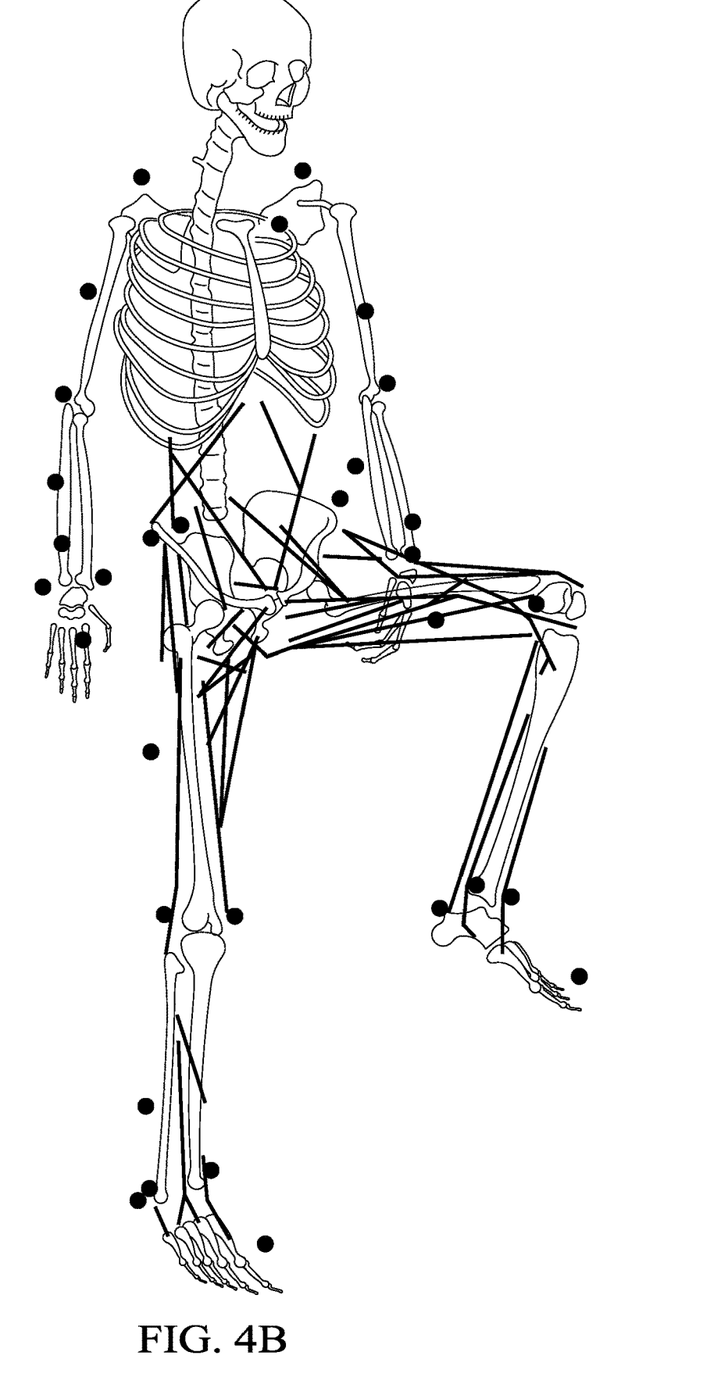

FIGS. 2, 3, 4A and 4B illustrate various motion capture data that may be provided by neural network 20 once trained. FIG. 2 illustrates joint model data. If desired, these joint locations can be converted to 3D joint locations, such as by using multi-view cameras. FIG. 3 illustrates body segment orientations. FIGS. 4A and 4B illustrate additional biomechanical information.

Figure 5:
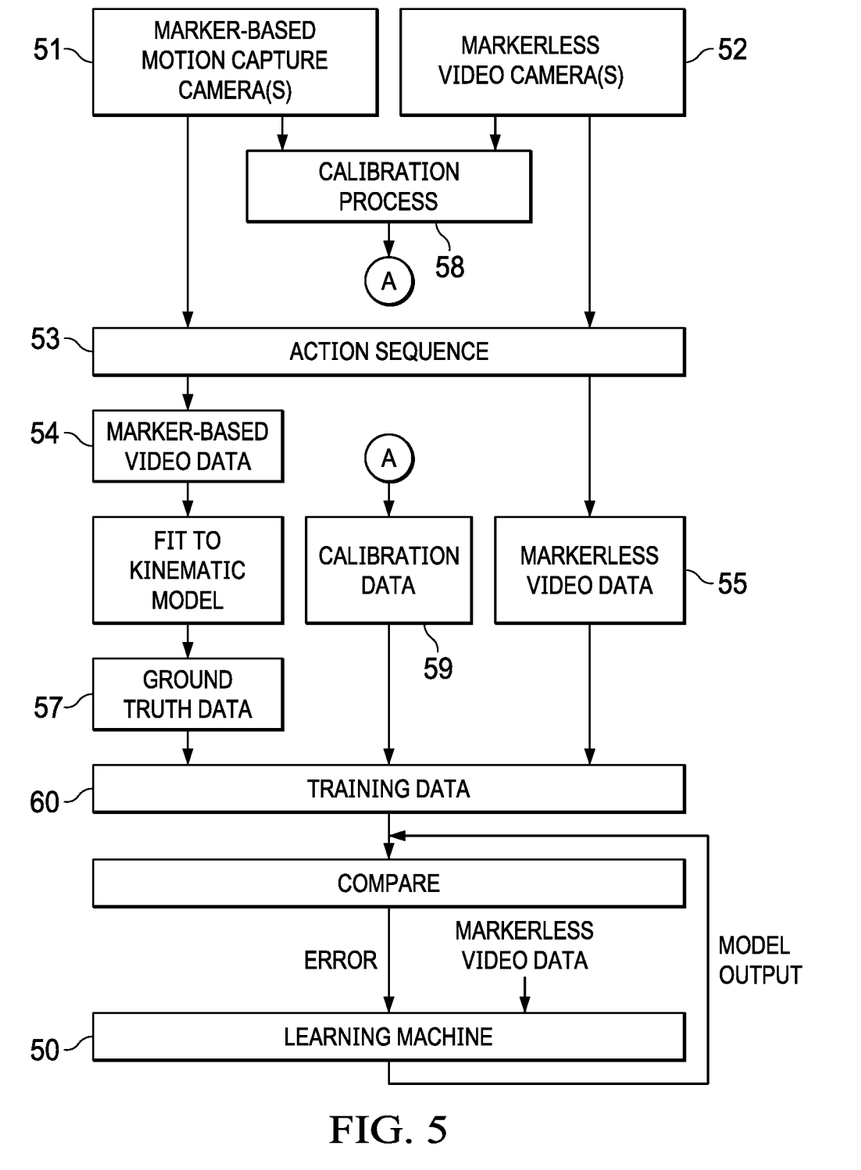
FIG. 5 illustrates a method of training a learning machine to provide motion capture data.

FIG. 5 illustrates a method of training neural network 20, or other machine learning model 50 for markerless motion capture in accordance with the invention. As explained above, it should be understood that the use of a "neural network" is for purposes of example, and the method may be implemented with other types of machine learning models, all using appropriate computing equipment.

A marker-based motion capture camera (or multiple cameras) 51 is used to capture video data of the animate subject. Markers are placed on joint locations of the subject. For purposes of example, the marker-based camera(s) use infrared markers and camera(s). other types of motion capture systems may be used to capture the ground truth motion training data.

A markerless motion capture camera (or multiple cameras) 52 is also used to capture video data of the animate subject.

In Step 53, the two sets of cameras 51 and 52 are simultaneously used to capture their respective video data of the subject in action. The result is a dataset of marker-based video data 54 and a dataset of markerless video data 55.

In Step 56, as described above, the marker-based video data is fit to a kinematic model. The subject's personalized data may also be factors in the model. The result is a dataset of ground truth data 57.

In Step 58, the marker-based camera(s) 51 and the markerless camera(s) 52 are calibrated as described above. The result is a set of calibration data 59.

In Step 60, the calibration data 59, the ground truth data 57, and markerless data 58 are calibrated together and combined into a training data set.

The collection of training data is repeated for multiple subjects, performing different motions. Thus, the above-described steps are repeated for different subjects and different action sequences. Each subject is fit to a kinematic model, and the model data is combined into the ground truth data set 57.

After ground truth dataset 57 has been collected, the markerless video dataset 55 is used as input to the machine learning model 50. The outputs are compared to the training data, and an iterative comparing an adjusting process is used to train the model 50.

Referring again to FIG. 1B, once the CNN/RNN 20 is trained, to provide a complete, end-to-end, biomechanical analysis using only cameras, the final system follows the following steps:
1. Each subject has associated personal data, such as height, weight, and strength parameters. The subject's motion is captured by cameras and each image is run through a 2D pose machine to identify joint locations. If desired, these can be triangulated to 3D using multi-view.
2. A novel 3D pose machine uses the resulting 2D joint locations and the images to predict the orientations, expressed as quaternions, of each body segment relative to each camera.
3. The relative rotations of the different body segments are used to reconstruct the biomechanical state of the subject from each camera.
4. Fused predictions from multiple cameras are done with mean or median filtering (this could be done via a neural network, but is currently done as separate step).

As shown in FIG. 1B, neural network 20 may be additionally trained with various biomechanical sensor data 22 to better inform the biomechanical representation of the subject.

Figure 6:
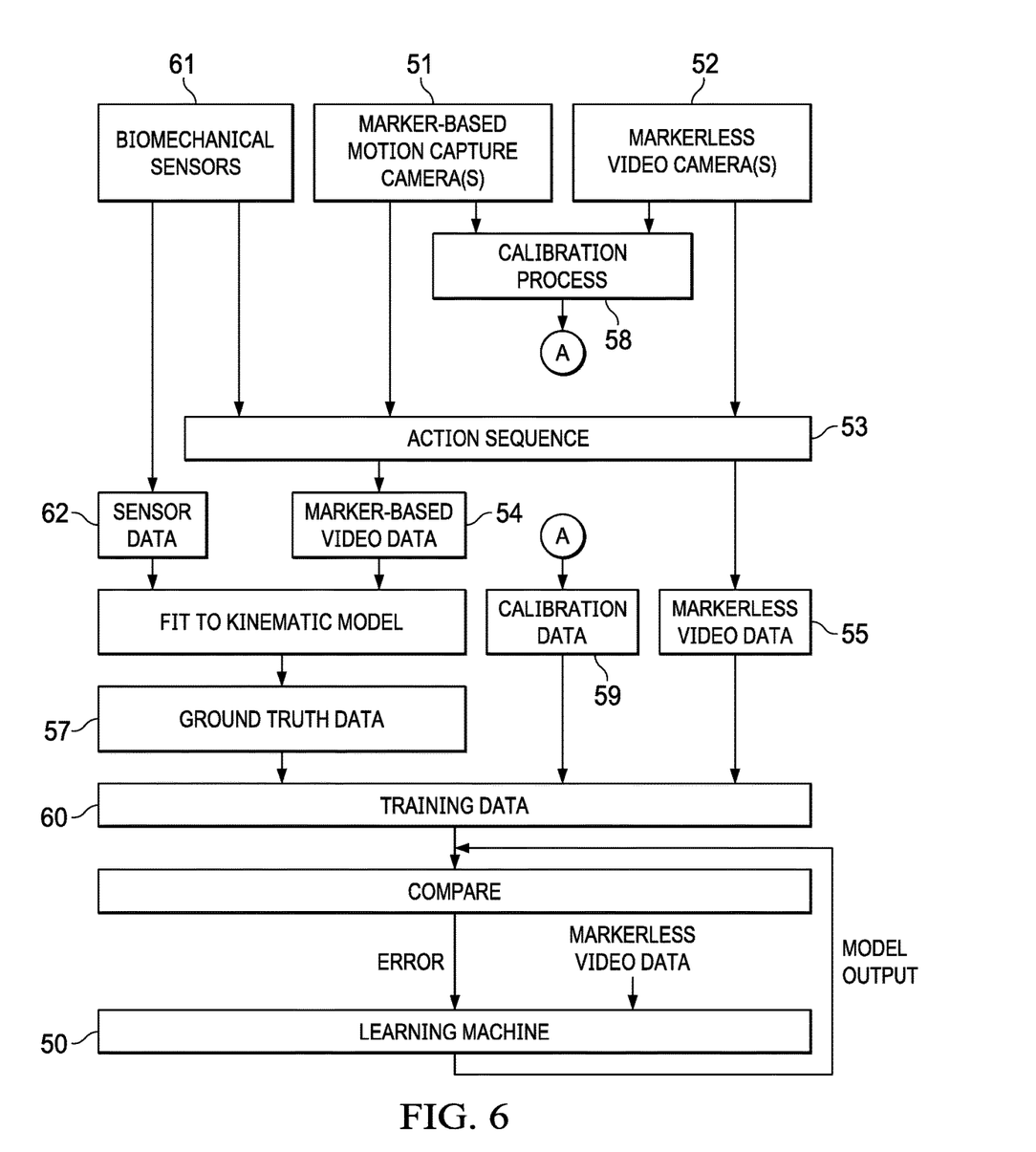
FIG. 6 illustrates the training method of FIG. 5, enhanced to include training with one or more types of biomechanical sensors.

FIG. 6 illustrates an enhanced training process that includes the use of one or more biomechanical sensors. In Step 61, the subject is outfitted with one or more types of these sensors. Such sensors can include force plates, electromyographic (EMG) sensors, accelerometers, magnetometers, and gyroscopes such as inertial measurement units (IMUs), and are placed on or near the subject as is appropriate for the sensor. The action sequence performed in Step 53 includes the use and collection of data from these sensors, as well as acquiring the video data from the two sets of cameras 51 and 52.

Examples of the resulting biomechanical sensor data 62 are ground reaction forces, muscle activation data, and IMU data. This data is integrated into the biomechanical model data 56, and becomes a part of the ground truth data 57 used for training.

Motion Prediction

Referring again to FIG. 1A, musculoskeletal motion capture data generated by neural network 12 can be used as input to a second neural network 13 that predicts movement of the subject. The motion capture data may be a comprehensive collection of musculoskeletal data such as described above or may be a subset of the above-described data, such as joint location data. It is expected that for many applications, predictive motion can be achieved with "sparse" motion capture data such as the joint locations of FIG. 2.

A feature of the invention is the recognition that gross skeletal motion as opposed to fine body movements will satisfactorily predict larger scale motion of the subject. In other words, the prediction of motion of a body segment, such as the pelvis, can be used to predict the motion of the subject's entire body. As another example, the subject's skull and head rotation can be used to predict motion. More than one body segment can be used as input to neural network 13.

An example of a suitable neural network is a temporal convolutional network (TCN). These networks replace the recursive structure of a recursive neural network (RNN) with dilated convolutional layers that allow for both greater tuning of the overall receptive field of the network and provide similar accuracy to RNNs at a greater speed. By using dilated convolutions, subsequent layers of the network can "see" larger and larger amounts of the input sequence and thus learn higher level trends in the sequence.

Another example of a suitable neural network 13 is a stacked Long-Short Term Memory (LSTM) network. Their structure allows for them to process sequences of data and learn temporal relationships within the data. An additional benefit of LSTMs is that they can be stacked on top of each other to allow each subsequent LSTM module to refine predictions. For neural network 13, a first layer accepts an input sequence of body position keypoints, where each set of keypoints represents some slice in time from time −n to 0 (now). The network takes this input and utilizes trained weights (in both LSTM layers and a Dense layer) and produces a matrix. A final layer reshapes the matrix into a single prediction at whatever future timestep on which the network was trained.

In selecting a network for the temporal prediction task of neural network 13, variables such as network depth, total number of parameters in the network, and various normalization techniques are considered. The time dimension has been found to be the primary variable requiring adjustment during training. The time dimension has an impact on the frame sampling frequency needed during prediction and the length of time needed prior to making a prediction.

A phased approach may be used for selecting and training neural network 13. In a first phase, the pixel location Euclidean distance between prediction and actual position of the validation set may be used to drive the training process. Ad-hoc training times are used, allowing loss to achieve a stable plateau without regard to training. Adjustments to data parameters such as batch size and kernel size were adjusted when needed to achieve the best loss. This process ensures a suitable candidate network. A second phase of training follows a more rigorous training process. Network training is often a tradeoff between amount of allowed training and eventual performance.

Pedestrian motion prediction addresses the problem of sudden changes in motion, often as a deviation from a longer period of straight-line motion. It is expected that video data of the subject for less than three seconds is adequate. A change in motion in as little as 500 milliseconds may predict future problematic behavior. Thus, it may be advantageous for training of neural network 13 to more heavily weight the last few frames prior to prediction, with less weight to earlier frames.

It should be understood that the motion prediction is based on position delta (position change) and not an absolute location. For motion prediction based on position delta, both x and y (two-dimensional) position of joints may be input. If desired, the training can be extended to three-dimensional joint movements and predictions. The predicted motion may be used to track the future path of the subject.

For training neural network 13, a pedestrian motion dataset of the types of actions performed by pedestrians is collected. These actions might include turning and change of pace. Neural network 13 is trained to recognize the movement of a selected body segment of the subject, such as the body core or head pose. The movement of this body segment is selected on the basis of its movements being indicative of movement of the entire subject.

The selected body segment can be the body core, as represented by the pelvic joints. Alternatively, the selected body segment might be the subject's head pose as represented by the skull or eye gaze. The basis of this selected segment is that information about the intent of a person to move can be found in subtle motions of the person's skeletal structure. The motions with which neural network 13 is trained can be changes in the center of gravity, balancing motions, or muscle flexing of subjects in the training data.

A subject's motion can be cyclic motion, such as a person walking in the same direction. Changes in speed and/or direction can indicate the subject's future position. Neural network 13 is "time domain aware" in the sense that a sequence of positions of the body segment in image space are used to estimate the future position and velocity of the subject.

For pedestrian collision avoidance applications, the output of neural network 13 allows for the prediction of sudden turns and sudden changes in speed. Head pose position can indicate if the subject is paying attention to traffic.

Depending on the application, the length of prediction may vary. In the case of pedestrian surveillance, the length of prediction need be only for so long as the pedestrian is potentially within the vehicle's path.

Figure 7:
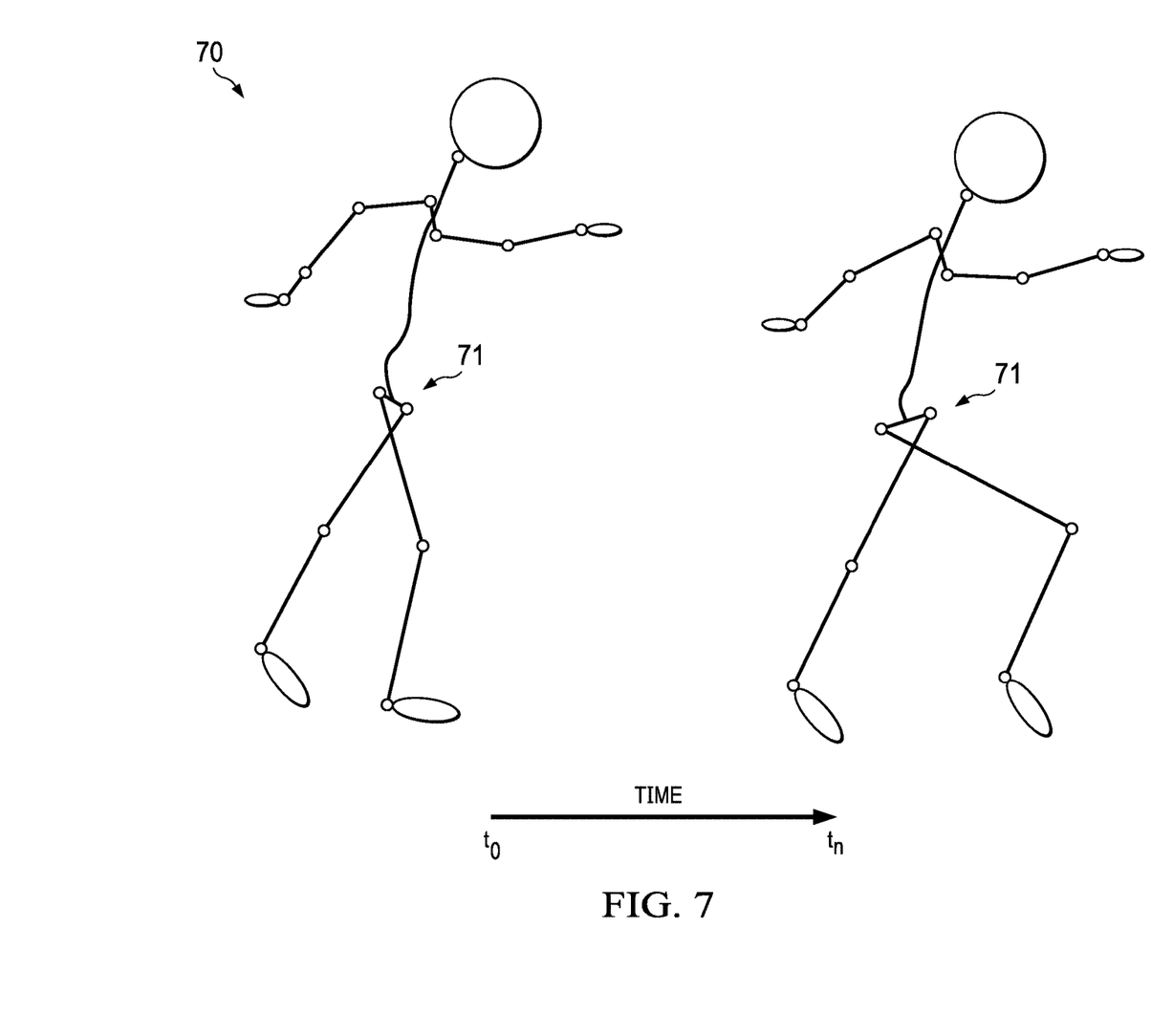
FIG. 7 illustrates a time sequence of motion capture data generated by the markerless motion process of FIG. 1A and used by the motion prediction process to predict future movement.

FIG. 7 illustrates an example of a time sequence of a subject's joint location data generated by neural network 12. This motion capture data is provided to neural network 13, which processes to data to predict when and where the subject will be within a given time period. For example, neural network 13 could be trained to predict whether the subject 70 will be within the vehicle's path.

In the example of FIG. 7, neural network is trained to follow and predict the movement of the subject's pelvis 71. In FIG. 7, the movement of the pelvis 71 indicates that the subject 70 has increased speed and is turning.

In pedestrian surveillance as well as for other applications, neural network 13 could be trained to follow and predict the motion of other body segments. Neural network 13 could be trained for more than one body segment. The particular body segment(s) selected will depend on what motion is of most interest for the applications.

Figure 8:
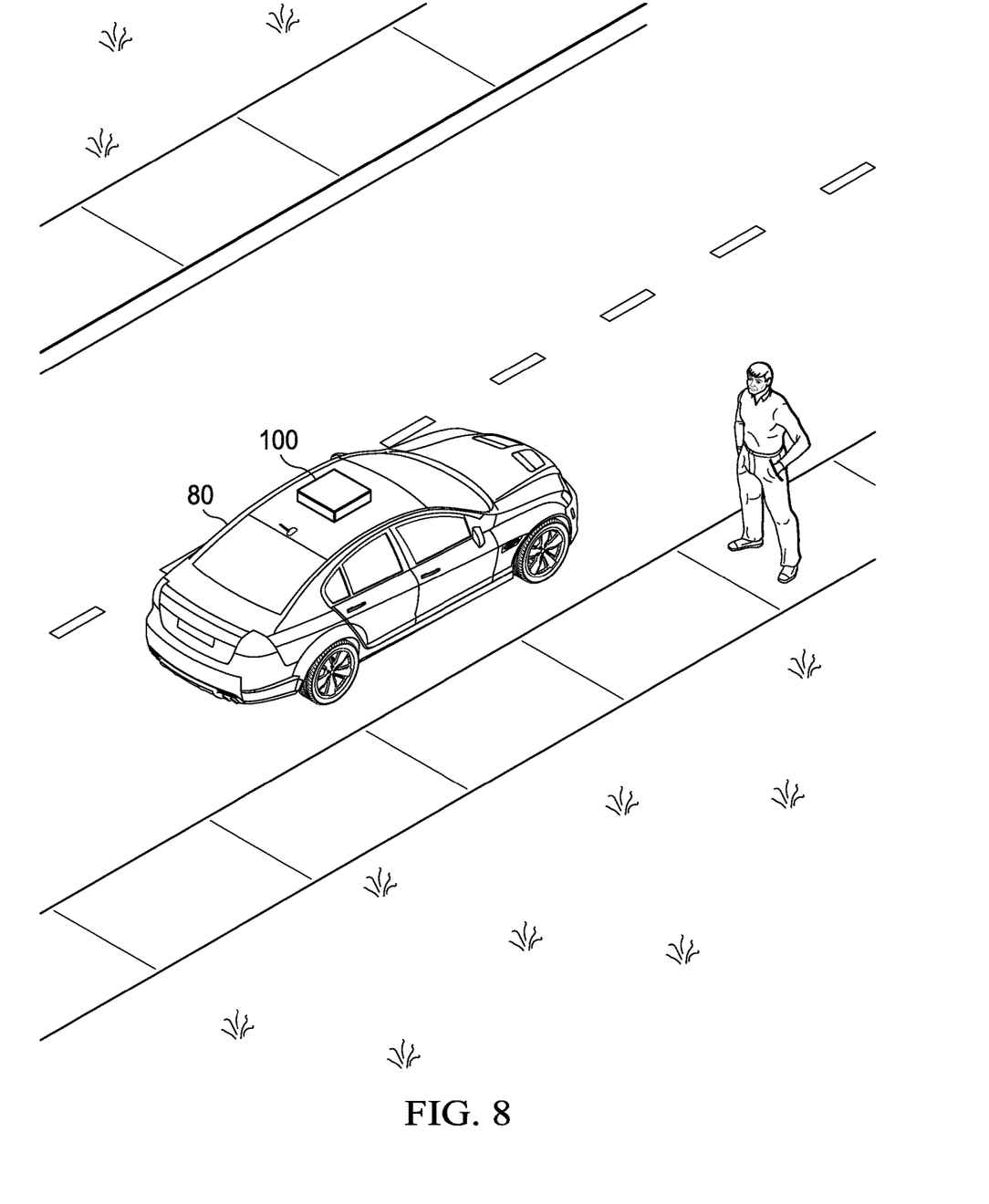
FIG. 8 illustrates a vehicle equipped with a predictive motion system.

FIG. 8 illustrates a vehicle 80 equipped with an on-board motion prediction system 100, used to predict motions of pedestrians. Vehicle 80 is an automated vehicle, equipped with automated control of steering, speed, and braking.

System 100 has at least one video camera 10 having a forward field of view of pedestrians that could potentially become in its path. In the example of this description, motion prediction system 100 is trained to predict human pedestrians but could be trained for other animals or objects.

As explained above in connection with FIG. 1A, system 100 has a motion capture neural network 12 that uses the video data to generate musculoskeletal motion capture data, which represents positions of one or more segments of the pedestrian's body during the video capture. A motion prediction network 13 uses the motion capture data to predict the subject's future position, and hence the subject's path.

For pedestrian-vehicle collision avoidance, it is expected that motion prediction in the immediate short term, for example less than 2 seconds, will allow collision avoidance.

A vehicle's collision avoidance process 15 determines if there is a likely collision with the pedestrian. If system 100 predicts a collision with a pedestrian, it sends a warning signal indicating a likely path to the vehicle's planning system, which then implements avoidance action such as braking or steering. The data provided by system 100 can include both speed and direction.

Data from system 100 informing vehicle 80 of the subject path can be combined with other sensor data. For example, a LIDAR (light detection and ranging) system can be installed to determine the distance of the pedestrian from vehicle 80. With this additional data, system 100 may operate with simple joint tracking (position and velocity) and not three-dimensional angle.

What is claimed is:

1. A method of predicting a motion of a body of a random animate subject, comprising:
   selecting a set of musculoskeletal segments internal to the body;
   wherein the set of musculoskeletal segments represent include at least one or more joints within the body that are not externally visible;
   wherein the musculoskeletal segments represent portions of the body whose past motion is predictive of the motion of the entire body;
   training a first neural network to receive a time sequence of markerless video data of the subject and to process the video data to generate a time sequence of musculoskeletal motion capture data of the subject;
   the musculoskeletal motion capture data represents motion of the musculoskeletal segments;
   training a second neural network to receive the musculoskeletal motion capture data and to process the data to generate a prediction of the subject's location based on position change of the set of musculoskeletal segments;
   capturing video data of the subject;
   delivering the video data to the first neural network;
   delivering the musculoskeletal motion capture data to the second neural network; and
   using the output of the second neural network to predict a future path of the subject.

2. The method of claim 1, wherein the musculoskeletal motion capture data is at least a portion of the subject's joints and wherein the second neural network is trained to track the movement of the subject's pelvis.

3. The method of claim 1, wherein the musculoskeletal motion capture data is at least the subject's skull and wherein the second neural network is trained to track the movement of the subject's head pose.

4. The method of claim 1, wherein the position change is based on x-y position data.

5. The method of claim 1, wherein the second neural network is trained to predict the subject's position based on less than three seconds of video data.

6. The method of claim 1, wherein the second neural network is trained by weighting later portions of the motion capture data more than earlier portions of the motion capture data.

7. The method of claim 1, wherein the second neural network is trained by receiving training data representing changes in balance, changes in center of gravity and/or muscle flexion of subjects depicted in the training data.

8. The method of claim 1, wherein the second neural network is a stacked long-short term memory network.

9. A motion prediction system for predicting a motion of a body of a random animate subject, comprising:
- a first neural network trained to receive a time sequence of markerless video data of the subject and to process the video data to generate a time sequence of musculoskeletal motion capture data of the subject;
- wherein the musculoskeletal motion capture data sequence represents a set of musculoskeletal segments internal to the body;
- wherein the set of musculoskeletal segments represent include at least one or more joints within the body that are not externally visible; and
- wherein the musculoskeletal segments represent portions of the body whose past motion is predictive of the motion of the entire body;
- a second neural network trained to receive the musculoskeletal motion capture data and to process the data to generate a prediction of the subject's location based on position change of the set of musculoskeletal segments.

10. The motion prediction system of claim 9, wherein the musculoskeletal motion capture data is at least a portion of the subject's joints and wherein the second neural network is trained to track the movement of the subject's pelvis.

11. The motion prediction system of claim 9, wherein the musculoskeletal motion capture data is at least the subject's skull and wherein the second neural network is trained to track the movement of the subject's head pose.

12. The motion prediction system of claim 9, wherein the position change is based on x-y position data.

13. The motion prediction system of claim 9, wherein the second neural network is trained to predict the subject's position based on less than three seconds of video data.

14. The motion prediction system of claim 9, wherein the second neural network is trained by weighting later portions of the motion capture data more than earlier portions of the motion capture data.

15. The motion prediction system of claim 9, wherein the second neural network is trained by receiving training data representing changes in balance, changes in center of gravity and/or muscle flexion of subjects depicted in the training data.

16. The motion prediction system of claim 9, wherein the second neural network is a stacked long-short term memory network.

17. An on-board motion prediction system for predicting a motion of a body of a pedestrian in or along a roadway on which a vehicle is traveling, comprising:
- at least one video camera for capturing video data of the pedestrian;
- a first neural network trained to receive a time sequence of the video data and to process the video data to generate a time sequence of musculoskeletal motion capture data of the subject;
- wherein the musculoskeletal motion capture data is a time sequence representing a set of musculoskeletal segments internal to the body;
- wherein the set of musculoskeletal segments represent include at least one or more joints within the body that are not externally visible; and
- wherein the musculoskeletal segments represent portions of the body whose past motion is predictive of the motion of the entire body;
- a second neural network trained to receive the musculoskeletal motion capture data and to process the data to generate a prediction of the subject's location based on position change of the set of musculoskeletal segments; and
- a collision avoidance process operable to determine if there is a likely collision with the pedestrian.

18. The motion prediction system of claim 17, wherein the musculoskeletal motion capture data is at least a portion of the subject's joints and wherein the second neural network is trained to track the movement of the subject's pelvis.

19. The motion prediction system of claim 17, wherein the musculoskeletal motion capture data is at least the subject's skull and wherein the second neural network is trained to track the movement of the subject's head pose.

20. The motion prediction system of claim 17, wherein the position change is based on x-y position data.

* * * * *